United States Patent
Yaman et al.

(10) Patent No.: US 11,782,217 B2
(45) Date of Patent: Oct. 10, 2023

(54) METHOD FOR REDUCING GAWBS NOISE BY REDUCING POLARIZATION DIFFUSION LENGTH

(71) Applicant: NEC Laboratories America, Inc., Princeton, NJ (US)

(72) Inventors: Fatih Yaman, Princeton, NJ (US); Eduardo Mateo Rodriguez, Tokyo (JP); Hassam Batshon, Monroe, NJ (US); Shinsuke Fujisawa, Princeton, NJ (US); Kohei Nakamura, Tokyo (JP); Takanori Inoue, Tokyo (JP); Yoshihisa Inada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 17/684,408

(22) Filed: Mar. 1, 2022

(65) Prior Publication Data

US 2022/0308290 A1    Sep. 29, 2022

Related U.S. Application Data

(60) Provisional application No. 63/155,780, filed on Mar. 3, 2021.

(51) Int. Cl.
*G02B 6/27* (2006.01)
*G02B 6/42* (2006.01)

(52) U.S. Cl.
CPC ........... *G02B 6/274* (2013.01); *G02B 6/4213* (2013.01)

(58) Field of Classification Search
CPC .............................. G02B 6/4213; G02B 6/274
See application file for complete search history.

(56) References Cited

U.S. PATENT DOCUMENTS 7,317,855 B2 *    1/2008   Chen ...................... C03B 37/12
                                                            385/123

OTHER PUBLICATIONS

Wai et al., "Polarization mode dispersion, decorrelation, and diffusion in optical fibers with randomly varying birefringence", Feb. 1996, Journal of Lightwave Technology, vol. 4, No. 2, pp. 148-157. (Year: 1996).*

Masataka et al., "Observation of guided acoustic-wave Brillouin scattering noise and its compensation in digital coherent optical fiber transmission", Apr. 2018, Optics Express 9165, vol. 26, No. 7, (Year: 2018).*

* cited by examiner

*Primary Examiner* — Sung H Pak
(74) *Attorney, Agent, or Firm* — Joseph Kolodka (57) ABSTRACT

Aspects of the present disclosure describe methods for reducing guided acoustic wave Brillouin (GAWBS) noise in an optical fiber that may be included in an optical communications system by reducing the polarization diffusion length of the fiber by increasing the birefringence of the optical fiber, the increased birefringence of the optical fiber being increased with respect to its average magnitude. Additionally, the polarization diffusion length is reduced by reducing the coherence length of birefringence of the optical fiber.

2 Claims, 4 Drawing Sheets

METHOD FOR REDUCING GAWBS NOISE BY REDUCING POLARIZATION DIFFUSION LENGTH

CROSS REFERENCE TO RELATED APPLICATIONS

This application claims the benefit of U.S. Provisional Patent Application Ser. No. 63/155,780 filed 3 Mar. 2020 the entire contents of each is incorporated by reference as if set forth at length herein.

TECHNICAL FIELD

This disclosure relates generally to optical communications systems, methods, and structures. More particularly, it describes methods for reducing low guided acoustic Brillouin scattering (GAWBS) noise by reducing polarization diffusion length.

BACKGROUND

As is known in the optical communications arts—and generally—optical signals are transmitted over optical fibers. Modern optical fibers are very good at transmitting optical signals without causing large distortions or attenuation to the signal. In other words, they retain a signal to noise ratio (SNR) quite well. Notwithstanding, there exist several noise sources. One of which—GAWBS—is a physical process that contributes to degrading optical signal quality.

SUMMARY

An advance in the art is made according to aspects of the present disclosure directed to a method for reducing GAWBS in optical fiber.

In sharp contrast to the prior art, methods according to the present disclosure advantageously reduce GAWBS noise by reducing polarization diffusion length of optical fiber by increasing the birefringence of the optical fiber, the increased birefringence of the optical fiber being increased with respect to its average magnitude.

BRIEF DESCRIPTION OF THE DRAWING

A more complete understanding of the present disclosure may be realized by reference to the accompanying drawing in which.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting once more that guided acoustic Brillouin scattering (GAWBS) is a physical process that occurs in optical fibers used for carrying optical telecommunications signals which adds distortion, or noise to the signals. The level (amount) of this distortion depends on the design and also the physical parameters of the optical fibers. Those skilled in the art will know and understand that many of the physical parameters of optical fibers that affect the level of GAWBS also affect other transmission properties of the fibers such as its attenuation, dispersion, nonlinearity, polarization mode dispersion, micro- and macro-bending loss, single-modedness etc., —which also significantly affect signal quality. As an example, increasing the core diameter or, more specifically, effective area of a fiber reduces GAWBS distortion however, beyond a certain point it also results in macro-bending loss and modal dispersion, or multi-path interference. As such, decreasing GAWBS in an optical transmission system without increasing distortion from other mechanisms remains a difficult problem.

Application Example

An illustrative and important optical communication system that employs optical fiber and is susceptible to GAWBS is an undersea, submarine, optical communication system having several spans.

As those skilled in the art will readily understand and appreciate, submarine systems including optical fiber cables are the true backbone of global communications. Nearly all inter-continental data is delivered through submarine cables that are laid on the seabed floor. As a result, contemporary high bandwidth services and applications including World-Wide-Web, cloud computing, fifth generation (5G) wireless networks, and those involving virtual reality.

As those skilled in the art will understand and appreciate further, there are many aspects of a submarine transmission system that distinguishes it from other optical fiber communication systems. First, they are very long, as they oftentimes connect different continents. Second, it is very expensive to lay optical fiber cables under water. Once the cable is laid it is extremely expensive to replace, upgrade, or repair the cables. Accordingly, even small degradations reduce the available transmission capacity.

As noted, one such source of degradation is GAWBS. The level of GAWBS depends on certain physical parameters of the optical fiber employed in addition to certain design parameters. Examples of physical parameters that affect GAWBS include the photo-elastic coefficient of the glass comprising the optical fiber, longitudinal and shear velocity of sound in the glass, the glass density, and operation temperature, etc. Examples of design parameters that affect GAWBS, include the cladding diameter, the effective area and the core-cladding refractive index difference and the choice of polymer coating are some of the parameters that affect the level of GAWBS. The impact of these parameters—since they are well known—have been optimized to avoid larger penalties from other sources such as attenuation, purity of spatial mode, tolerance to bending etc.

Figure 1:
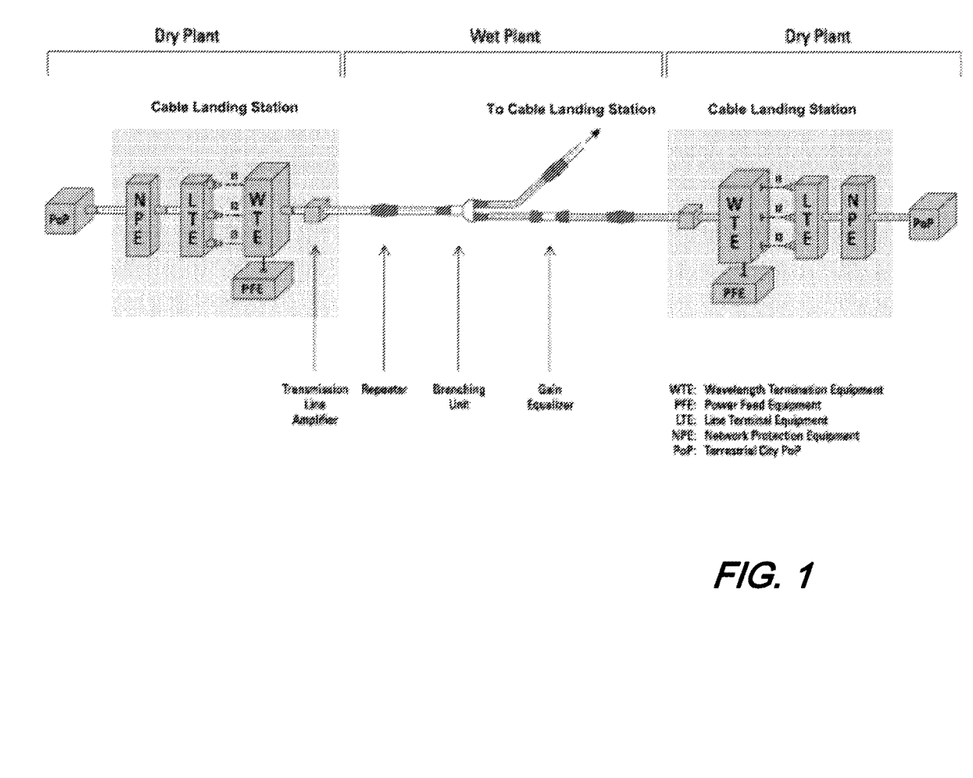
FIG. 1 is a schematic diagram of a submarine optical fiber cable system as is known in the art.

FIG. 1 is a schematic diagram of an illustrative submarine cable system known in the art. With reference to that figure, data to be transmitted originates in one of the cable landing stations. It is delivered to other cable stations across the sea through the submarine cable. Submarine cables have mainly two parts. 1) The cable span, 2) repeaters.

Each cable span can be 40 km to 150 km—or longer—but typically are in the 50-80 km range. As is shown in the figure a cable span typically includes several elements including fiber optic cable, repeater(s), branching unit(s), and amplifier(s). For our purposes of this immediate discussion, we are most concerned with the optical fiber cables.

As is known, optical fibers are thin strands of glass that can guide light within them while imparting a low attenuation. Optical fibers are typically about 250 microns diameters, are made of a pure silica glass and exhibit a substantially cylindrical shape. Light is guided through a doped center (core) that is surrounded by a cladding configured to result in a total internal reflection of the guided light. Typically, the core diameter is on the order of 5-12 micrometers, and the cladding diameter is about 125 micrometers. The glass may be further coated by protective polymers bringing the overall diameter of an optical fiber to about 250 micrometers. Optical cables include many such fibers. The data capacity of an optical cable is therefore proportional to the number of fibers in the cable. For undersea applications—despite favorable optical fiber transmission efficiencies—amplification is required, and such amplifiers are typically housed in repeaters located at pre-determined locations of an undersea cable. Typically, there is at least one amplifier dedicated to a single fiber in each repeater. Unfortunately, amplifiers add noise during amplification.

Figure 2:
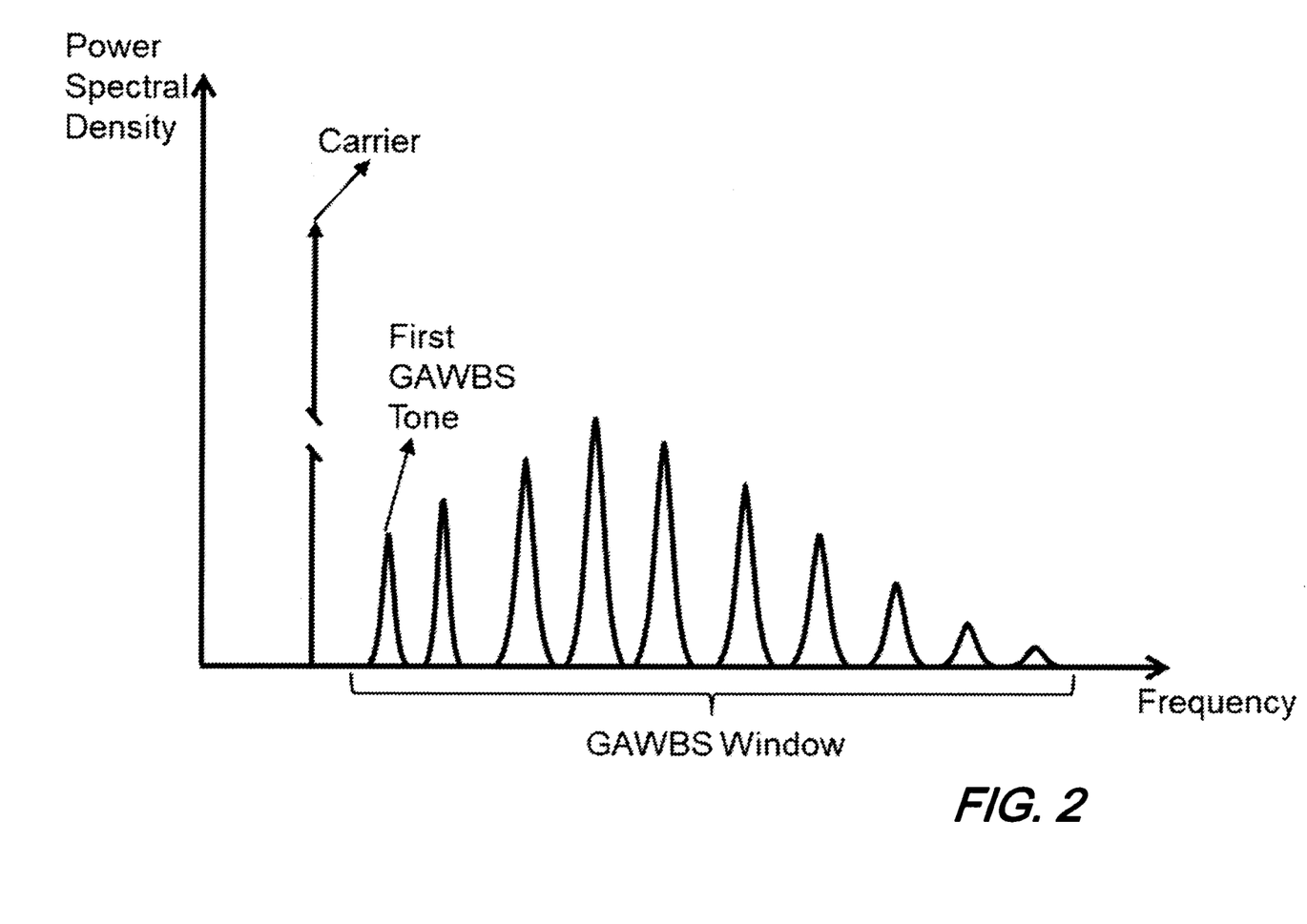
FIG. 2 is a plot of a GAWBS spectrum according to aspects of the present disclosure.

Of interest to our disclosure, GAWBS is known to be caused by acoustic vibrations in the glass fibers. Due to the ambient temperature, there is constant vibrations in the glass fibers that keep bouncing back and forth between the outer boundaries of the glass, mainly the circumference, as the two ends of the fibers are typically very far. Because of the finite size of the glass fibers, these vibrations occur in modes. Considering the speed of sound in glass about 5800 m/s and the diameter of the glass about 125 μm these vibrations modes (particularly the symmetric dilational modes) have a frequency separation of the order of 40 MHz with the fundamental frequency around 30 MHz. These acoustic vibrations cause modulation of the refractive index at the location where the light is passing through. This refractive index modulation in turn causes the phase of the light to be modulated at the same frequency of the acoustic modes. This phase modulation presents itself as the source of the degradation. Even though the level of modulation in the refractive index and hence in the optical phase is miniscule, it adds up to significant levels after thousands of kilometers. As an example, if we send a laser with no modulation on it, i.e., a continuous wave laser through a fiber and look at its spectrum, we expect to see something like that shown schematically in FIG. 2 which shows a plot of a GAWBS spectrum wherein a carrier is a laser light sent to a fiber under test. The broken line is indicative that the carrier is much larger than GAWBS tones. Note further that side tones generated by GAWBS are much smaller than the carrier, i.e., the cw laser. These GAWBS tones act as additional noise when the laser is modulated by data.

Figure 3:
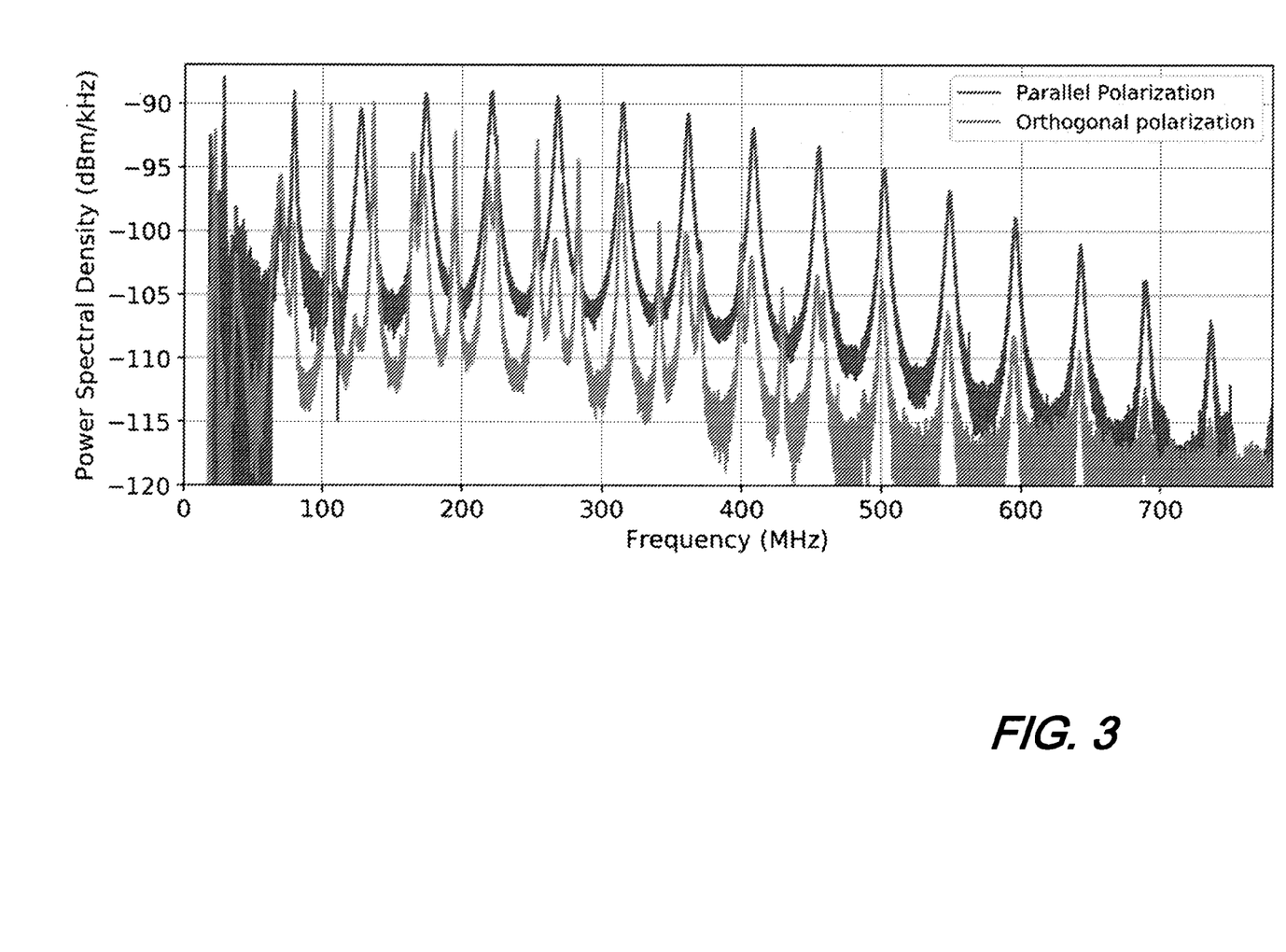
FIG. 3 is a plot of a measured GAWBS spectrum after 84 km of single mode fiber with an effective area of 110 μm, according to aspects of the present disclosure.

FIG. 3 is a plot showing a measured GAWBS spectrum after 84 km of single-mode fiber with an effective area of 110 μm$^2$. Note that GAWBS generates noise in both polarizations one parallel to the input and a lesser amount in orthogonal polarization. In this plot, the carrier is removed.

Note that FIG. 3 shows an actual measurement result, showing how small the contribution is from a single span of fiber. The GAWBS creates noise in both positive and negative frequencies with respect to the carrier, however they are perfectly symmetric so only one-sided spectrum is shown.

Theoretical Background for GAWBS Spectrum and how it is Related to the Mode Field Distribution in the Fiber GAWBS is generated by transverse acoustic modes in the fiber. These modes do not have any longitudinal components, which means they only generate forward scattering. The acoustic frequencies allowed by a given fiber can be found through solving the following characteristic equation for:

$$|B|=0 \tag{5}$$

where |•| stands for determinant and B is 2×2 matrix given by $$\begin{bmatrix} \left(n^2 - 1 - \frac{y^2}{2}\right)J_n(\alpha y) & \left(n(n^2 - 1) - \frac{y^2}{2}\right)J_n(y) - \\ & (n^2 - 1)yJ_{n+1}(y) \\ (n - 1)J_n(\alpha y) - \alpha y J_{n+1}(\alpha y) & \left(n(n - 1) - \frac{y^2}{2}\right)J_n(y) + \\ & yJ_{n+1}(y) \end{bmatrix} \tag{6}$$

where $y=2\pi f a/V_s$, $\alpha=V_s/V_d$, $V_s$ is the shear sound velocity, $V_d$ is the longitudinal sound velocity, and f is the vibration frequency sound wave, a is the fiber cladding radius, and n is an integer that denotes solutions for different acoustic mode groups. For each n, Eqs(5-6) has discrete solutions that can be numbered as integers m.

The acoustic modes can be described by the displacement vector fields for these modes which are given by:

$$U_r(r, t) = \tag{7}$$
$$C_{nm}\frac{y_{nm}}{a}\left\{-A_2\left[\frac{an}{r}J_n\left(\frac{\alpha y_{nm}r}{a}\right) - \alpha j_{n+1}\left(\frac{\alpha y_{nm}r}{a}\right)\right] + A_1\frac{na}{r}J_n\left(\frac{y_{nm}r}{a}\right)\right\}$$
$$\cos(n\varphi)\sin(\Omega_{nm}t)$$

$$U_\varphi(r, t) = C_{nm}\frac{y_{nm}}{a}$$
$$\left\{-A_1\left[\frac{an}{r}J_n\left(\frac{y_{nm}r}{a}\right) - J_{n+1}\left(\frac{y_{nm}r}{a}\right)\right] + A_2\frac{na}{r}J_n\left(\frac{\alpha y_{nm}r}{a}\right)\right\}\sin(n\varphi)\sin(\Omega_{nm}t)$$

$$\Theta_d(n\phi) = \begin{cases} \cos(n\phi), & d = 0 \\ \sin(n\phi), & d = 1 \end{cases}$$

$$\Psi_d(n\phi) = \begin{cases} \sin(n\phi), & d = 0 \\ -\cos(n\phi), & d = 1 \end{cases}$$

where $A_1=nB_{11}$, $A_2=B_{12}$, $\overline{U}=[U_r, U_\varphi, 0]$ is the displacement vector field in cylindrical coordinates defined by radial, and angular coordinates r and φ, respectively, and $C_{nm}$ is the amplitude of the corresponding mode, $\Omega_{nm}=2\pi f_{nm}$, $f_{nm}$ are the discrete frequencies that satisfy the characteristic equation given by Eq.(6). Note that we may drop the time dependent portion when opt relevant.

The acoustic vibrations cause a strain tensor in the cross plane of the fiber which in turn creates modulation of the refractive index of the fiber. The non-zero strain tensor components can be found by the following relations:

$$S_{rr} = \frac{\partial U_r}{\partial r} \qquad (8)$$

$$S_{\varphi\varphi} = \frac{1}{r}\frac{\partial U_\varphi}{\partial \varphi} + \frac{U_r}{r}$$

$$S_{r\varphi} = \frac{1}{2}\left(\frac{1}{r}\frac{\partial U_r}{\partial \varphi} + \frac{\partial U_\varphi}{\partial r} - \frac{U_\varphi}{r}\right)$$

Note that tensor components in z axis is zero. Inserting Eq(7) into Eq(8), we obtain $$S_{rr} = \qquad (9)$$
$$C_{nm}\left(\frac{y_{nm}}{a}\right)^2\left\{-A_2\left[\frac{n(n-1)}{\rho^2}J_n(\alpha p) - \frac{(2n+1)\alpha}{\rho}J_{n+1}(\alpha\rho) + \alpha^2 J_{n+2}(\alpha\rho)\right] + A_1\left[\frac{n(n-1)}{\rho^2}J_n(\rho) - \frac{n}{\rho}J_{n+1}(\rho)\right]\right\}\cos n\varphi$$

$$S_{\varphi\varphi} =$$
$$C_{nm}\left(\frac{y_{nm}}{a}\right)^2\frac{1}{\rho}\left\{A_2\left[\frac{n}{\rho}J_n(\alpha\rho) + \alpha J_{n+1}(\alpha\rho)\right] - A_1\left[\frac{n}{\rho}J_n(\rho) - 2J_{n+1}(\rho)\right]\right\}\cos n\varphi$$

$$S_{r\varphi} = C_{nm}\left(\frac{y_{nm}}{a}\right)^2\frac{1}{2\rho}$$
$$\left\{A_2\left[\frac{n^2}{\rho}J_n(\alpha p) - (n+2)\alpha J_{n+1}(\alpha\rho)\right] - A_1\left[\frac{n^2}{\rho}J_n(\rho) - 2nJ_{n+1}(\rho) + \rho J_{n+2}(\rho)\right]\right\}$$
$$\sin n\varphi$$

where $\rho = y_{nm}r/a$. In order to find the level of change in the refractive index due to the strain induced by the acoustic vibrations we use the photo-elastic relation for isotropic materials in the reduced notation that relates the strain tensor to the impermeability tensor as follows which is given in the Cartesian coordinates as follows.

$$\begin{bmatrix}\Delta\eta_{xx}(r,\varphi)\\ \Delta\eta_{yy}(r,\varphi)\\ \Delta\eta_{zz}(r,\varphi)\\ \Delta\eta_{yz}(r,\varphi)\\ \Delta\eta_{xz}(r,\varphi)\\ \Delta\eta_{xy}(r,\varphi)\end{bmatrix} = \qquad (10)$$

$$\begin{bmatrix}p_{11} & p_{12} & p_{12} & 0 & 0 & 0\\ p_{12} & p_{11} & p_{12} & 0 & 0 & 0\\ p_{12} & p_{12} & p_{11} & 0 & 0 & 0\\ 0 & 0 & 0 & p_{11}-p_{12} & 0 & 0\\ 0 & 0 & 0 & 0 & p_{11}-p_{12} & 0\\ 0 & 0 & 0 & 0 & 0 & p_{11}-p_{12}\end{bmatrix}\begin{bmatrix}S_{xx}(r,\varphi)\\ S_{yy}(r,\varphi)\\ S_{zz}(r,\varphi)\\ S_{yz}(r,\varphi)\\ S_{xz}(r,\varphi)\\ S_{xy}(r,\varphi)\end{bmatrix}$$

wherein $$\Delta\eta_{ab}(r,\varphi) = \Delta\left(\frac{1}{\varepsilon_{ab}(r,\varphi)}\right) \approx -\frac{\Delta\varepsilon_{ab}(r,\varphi)}{\varepsilon_{ab}^2} \qquad (11)$$

and $\varepsilon_{ab}$ are the components of the dielectric permittivity tensor, and the approximation on the right holds for small changes in the dielectric permittivity as is the case for GAWBS. From Eq.(10) we obtain $$\Delta\eta_{xx}(r,\varphi) = p_{11}S_{xx} + p_{12}S_{yy}$$

$$\Delta\eta_{yy}(r,\varphi) = p_{12}S_{xx} + p_{11}S_{yy}$$

$$\Delta\eta_{xy}(r,\varphi) = (p_{11} - p_{12})S_{xy} \qquad (12)$$

We can write the strain tensor from the Cartesian coordinates to the cylindrical coordinates as follows:

$$S_{xx} = (\cos\varphi)^2 S_{rr} + (\sin\varphi)^2 S_{\varphi\varphi} - \sin 2\varphi S_{r\varphi}$$

$$S_{yy} = (\sin\varphi)^2 S_{rr} + (\cos\varphi)^2 S_{\varphi\varphi} + \sin 2\varphi S_{r\varphi}$$

$$S_{xy} = \sin 2\varphi (S_{rr} - S_{\varphi\varphi})/2 - \cos 2\varphi \qquad (13)$$

Inserting Eq.(13) into Eq.(12) we can write the impermeability tensor components as follows:

$$\Delta\eta_{xx}(r,\varphi) = \qquad (14)$$
$$\frac{p_{11}+p_{12}}{2}(S_{rr}+S_{\varphi\varphi}) + \frac{p_{11}-p_{12}}{2}[(S_{rr}-S_{\varphi\varphi})\cos 2\varphi - 2S_{r\varphi}\sin 2\varphi]$$

$$\Delta\eta_{yy}(r,\varphi) =$$
$$\frac{p_{11}+p_{12}}{2}(S_{rr}+S_{\varphi\varphi}) - \frac{p_{11}-p_{12}}{2}[(S_{rr}-S_{\varphi\varphi})\cos 2\varphi - 2S_{r\varphi}\sin 2\varphi]$$

$$\Delta\eta_{xy}(r,\varphi) = \frac{p_{11}-p_{12}}{2}[(S_{rr}-S_{\varphi\varphi})\sin 2\varphi - 2S_{r\varphi}\cos 2\varphi]$$

Note that the expression for $\Delta\eta_{ab}$ (r, φ) can be separated into two parts each of which only depends on r or cp. This can be noted by looking at Eq.(14) where the terms dependent on φ are explicit, and moreover, it is clear from Eq.(9) that the strain tensor components can be separated into two parts that only depends on r or φ. We will do this more explicitly by employing the following definition:

$$S_{rr}(r,\varphi) = s_{rr}(r)\cos 2\varphi$$

$$S_{\varphi\varphi}(r,\varphi) = s_{\varphi\varphi}(r)\cos 2\varphi$$

$$S_{r\varphi}(r,\varphi) = s_{r\varphi}(r)\sin 2\varphi \qquad (15)$$

We will relate the changes in the permeability tensor to the refractive index changes. Eq.(14) describes how the impermeability tensor components vary across the fiber cross section due to the acoustic vibrations. In general, such spatial variations in the refractive index distribution would scatter the signal travelling in the fiber into all the modes supported by the optical fiber and radiation modes. When the index modulations are very small, power lost these scattering would be negligible, and not of interest to us. The non-negligible contribution would be to optical signal coupling into the modes supported by the fiber in the absence of acoustic vibrations. Though this analysis can be extended to multi-mode fibers, here we will limit the analyses to single moded fibers. In this case the available modes are the two orthogonal polarization modes. We can expand the optical field in these two modes as follows:

$$\vec{E}(r,z,t) = f(r)[h_x(z)\hat{e}_x + h_y(z)\hat{e}_y]e^{-i(kz-\omega t)} \qquad (16)$$

In Eq.(16) we expanded the electric field of the optical mode in terms of the two polarization modes aligned along the unit vectors $\hat{e}_x$ and $\hat{e}_y$. Here the assumption is that the fiber is single moded with a propagation constant of $k = n_0 k_0 = 2\pi n_0/\lambda$, where $n_0 = \sqrt{\varepsilon}$ is the refractive index of the fiber without the acoustic perturbation, and E is the corresponding dielectric permittivity. Fiber's intrinsic anisotropy is neglected, and same propagation constant is assumed for both polarization modes. Moreover, it is assumed that both polarizations have the same mode field distribution in the transverse direction $f(r)$.

Note that, in Eq.(16), the longitudinal component of the optical mode is not included even though in general it is not zero, even though it is typically small. This is warranted as the z-components of the permeability tensors vanish anyways since the acoustic modes we are looking are transverse modes. However, because of the acoustic vibrations, the evolution of the two polarizations along the fiber, i.e., in the z-axis is given by two separate functions, which allows for coupling of the two polarizations components to one another as well back to themselves. The coupled mode equations for the optical mode can be written as follows:

$$\frac{\partial h_a(z)}{\partial z} = i \sum_{b=x,y} \kappa_{ij} h_j(z), \quad a = x, y, \quad i = \sqrt{-1} \qquad (17)$$

where the coupling coefficients $\kappa_{ij}$ are given by:

$$\kappa_{ab} = \frac{k_0}{2\sqrt{\varepsilon}} \frac{\int_0^{2\pi} \int_0^\infty \Delta\varepsilon_{ab}(r,\varphi) f(r)^2 r dr d\varphi}{\int_0^{2\pi} \int_0^\infty f(r)^2 r dr d\varphi} \quad a, b = x, y \qquad (18)$$

As we now note, Eq.(17) is a central relationship of our disclosure. One can see that the coupling coefficients are just a normalized overlap integral between the optical mode field distribution and the strain distribution caused by the acoustic vibrations. Since we know the strain distribution generated by the acoustic vibrations as shown in Eq.(9), through we would know their overlap with the optical mode field.

We can rewrite Eq.(18) as follows by using the definition in Eq.(15):

$$\kappa_{xx} \propto p_p \int_0^{2\pi} \cos(n\varphi) d\varphi \int_0^\infty (s_{rr}+s_{\varphi\varphi}) f(r)^2 r dr + p_m \int_0^{2\pi} \cos(n\varphi)\cos(2\varphi) d\varphi \int_0^\infty (s_{rr}-s_{\varphi\varphi}) f(r)^2 r dr + 2 p_m \int_0^{2\pi} \sin(n\varphi)\sin(2\varphi) d\varphi \int_0^\infty s_{r\varphi} f(r)^2 r dr \qquad (19)$$

$$\kappa_{yy} \propto p_p \int_0^{2\pi} \cos(n\varphi) d\varphi \int_0^\infty (s_{rr}+s_{\varphi\varphi}) f(r)^2 r dr - p_m \int_0^{2\pi} \cos(n\varphi)\cos(2\varphi) d\varphi \int_0^\infty (s_{rr}-s_{\varphi\varphi}) f(r)^2 r dr - 2 p_m \int_0^{2\pi} \sin(n\varphi)\sin(2\varphi) d\varphi \int_0^\infty s_{r\varphi} f(r)^2 r dr \qquad (20)$$

$$\kappa_{xy} \propto p_m \int_0^{2\pi} \cos(n\varphi)\sin(2\varphi) d\varphi \int_0^\infty (s_{rr}-s_{\varphi\varphi}) f(r)^2 r dr - 2 p_m \int_0^{2\pi} \sin(n\varphi)\cos(2\varphi) d\varphi \int_0^\infty s_{r\varphi} f(r)^2 r dr \qquad (21)$$

where $p_p = (p_{11}+p_{12})/2$ and $p_m = (p_{11}-p_{12})/2$, and only the integration in numerator in Eq.(18) is shown as the integral in denominator just a normalization factor by the total power in the optical mode. We can see that in Eq.(21), which creates coupling between the two polarizations, all the integrals over $\varphi$ (angular integrals) vanishes for any integer n. This is only true when we choose the x- and y-polarizations in the same axis defined by the angle $\varphi$.

Angular integrals in Eq.(19-20) do not vanish only for two values of n: n=0, and n=2. For n=0, the angular integrals in the first terms on the right is just $2\pi$ as the cosine term is just 1, for both Eqs.(17) and (18). However, the angular integrals in the second and third terms vanish. For the case of n=2, on the other hand, the first terms on the right vanish, and the second and third angular integrals are just Tr. Therefore we can simplify Eqs.(19-20) as follows:

$$n = 0, d = 0: \kappa_{yy} = \kappa_{xx} = \frac{k_0 n_0^3}{2} \frac{p_p \int_0^\infty (s_{rr}+s_{\varphi\varphi}) f(r)^2 r dr}{\int_0^\infty f(r)^2 r dr} \sin(\Omega_{nm} t + \zeta), \qquad (22)$$

$$\kappa_{xy} = 0$$

$$n = 0, d = 1: \kappa_{yy} = \kappa_{zz} = \kappa_{xy} = 0$$

$$n = 2,$$

$$d = 0: -\kappa_{yy} = \kappa_{xx} = \frac{k_0 n_0^3}{4} \frac{p_m \int_0^\infty (s_{rr}-s_{\varphi\varphi}+2s_{r\varphi}) f(r)^2 r dr}{\int_0^\infty f(r)^2 r dr} \sin(\Omega_{nm} t + \zeta),$$

$$\kappa_{xy} = 0$$

$$n = 2, d = 1: \kappa_{yy} = \kappa_{xx} = 0,$$

$$\kappa_{xy} = \frac{k_0 n_0^3}{4} \frac{p_m \int_0^\infty (s_{rr}-s_{\varphi\varphi}+2s_{r\varphi}) f(r)^2 r dr}{\int_0^\infty f(r)^2 r dr} \sin(\Omega_{nm} t + \zeta)$$

where we used the approximation in Eq.(11) and the definition $n_0 = \sqrt{\varepsilon}$.

$$\frac{\partial |h(z)\rangle}{\partial z} = -\frac{\alpha}{2}|h(z)\rangle + i\bar{k}|h(z)\rangle + i\Delta k \sigma_1 |h(z)\rangle + i\bar{\kappa}(t)|h(z)\rangle + i\overrightarrow{\Delta\kappa}(t)\cdot\vec{\sigma} \qquad (23)$$

where $$|h(z)\rangle = \begin{bmatrix} h_x(z) \\ h_y(z) \end{bmatrix}, \sigma_1 = \begin{bmatrix} 1 & 0 \\ 0 & -1 \end{bmatrix}, \sigma_2 = \begin{bmatrix} 0 & 1 \\ 1 & 0 \end{bmatrix}, \sigma_3 = \begin{bmatrix} 0 & -i \\ i & 0 \end{bmatrix} \qquad (24)$$

and $\alpha$ is the fiber attenuation, $$\bar{k} = \frac{k_x + k_y}{2}$$

is the average propagation constant $$\Delta k = \frac{k_x - k_y}{2}$$

is the fiber birefringence in the absence of GAWBS, $$\bar{\kappa} = \frac{\kappa_{xx} + \kappa_{yy}}{2}, \overrightarrow{\Delta\kappa} = \left[\frac{\kappa_{xx} - \kappa_{yy}}{2}, \kappa_{xy}, 0\right]$$

are the isotropic and anisotropic part of the coupling coefficients induced by the GAWBS, $\sigma_1, \sigma_2, \sigma_3$ are the 2×2 Pauli matrices, and $\vec{\sigma} = [\sigma_1, \sigma_2, \sigma_3]$.

The "·" stands for the dot product, yielding $\overrightarrow{\Delta\kappa}(t) \cdot \vec{\sigma} = \Delta\kappa_1 \sigma_1 + \Delta\kappa_2 \sigma_2 + \Delta\kappa_3 \sigma_3$. We will also assume that the field |h⟩ is normalized to yield optical power, i.e., $P = \langle h|h \rangle$.

Given a short piece of fiber with known birefringence and GAWBS parameters, Eq.~(23) is well defined and it can be integrated. So far the variation of the acoustic modes along the fiber was ignored. It is implicitly assumed that the acoustic mode oscillates coherently along the entire fiber length as $\sin(\Omega_{nm}t+\zeta)$ with a fixed phase of $\zeta=0$. These are only approximations that are justified by the fact that the acoustic modes that contribute to GAWBS extend much longer in the fiber compared to the fiber diameter. In reality it is expected that the GAWBS modes separated by long distances in the fiber would be oscillating with independent and random phases. Here this random variation along the length will be modeled as the fiber consisting of short lengths that are much longer than the fiber diameter but short enough that the acoustic mode would be completely coherent within. At the same time it will be assumed that the acoustic modes would be completely independent from the modes in other sections. In other words, twill be treated as a random variable uniformly distributed between $[-\pi, \pi)$ that is constant within the mode coherence length but completely independent between different sections satisfying $$\langle \zeta(z_1)\zeta(z_2)\rangle = \begin{cases} \frac{\pi^2}{3}, & |z_1 - z_2| \le l_c \\ 0, & |z_1 - z_2| > l_c \end{cases} \quad (25)$$

Incorporating random variations in the acoustic mode phase and the birefringence along the fiber, Eq.~(23) can be put in the following stochastic form $$\frac{\partial |h(z)\rangle}{\partial z} = \left(-\frac{\alpha}{2} + i\bar{\kappa} + i\vec{b}(z)\cdot\vec{\sigma}\right)|h(z)\rangle + \left(i\bar{\kappa} + i\vec{\Delta\kappa}\cdot\vec{\sigma}\right)|h(z)\rangle \quad (26)$$

$$\sin(\Omega_{nm}t + \zeta(z))$$

where the vector $\vec{b}$ is the random fiber birefringence vector that randomly rotates the polarization. Since GAWBS is a very weak effect, the optical field propagates largely unaffected by the scattering therefore a perturbative formal solution of the following form can be sought $$\frac{\partial |h_0\rangle}{\partial z} \approx 0, \quad \frac{\partial |\delta h(z)\rangle}{\partial z} \approx i\left(\bar{\kappa} + \vec{\Delta\kappa}(z)\cdot\vec{\sigma}'\right)|h_0\rangle \sin(\Omega_{nm}t + \zeta(z)). \quad (27)$$

where $\vec{\Delta\kappa'}(z)\cdot\vec{\sigma} = U(z)\vec{\Delta\kappa}(z)\cdot\vec{\sigma}U^\dagger(x)$. As the matrix $U(z)$ is a random unitary matrix, $\vec{\Delta\kappa'}(z)$ is a randomly rotated version of $\vec{\Delta\kappa}(z)$ at a distance $z$. Since the equation is expressed in the rotating reference frame of the optical carrier due to the fiber birefringence the GAWBS term is rotating with the same statistics. This allows to describe this random rotation in terms of the polarization coherence length $l_p$ defined as the distance the where the average of Stokes vector over an ensemble decays by a factor of natural logarithm. However, for the sake of simplicity, the polarization rotation will be modeled similar to the case of acoustic mode phase variation where $\vec{\Delta\kappa}(z)$ will be assumed to be constant over a section of length $l_p$ and completely random orientation at a different section, i.e., $\langle \vec{\Delta\kappa'}(z_1)\ne\vec{\Delta\kappa'}(z_2)\rangle = \Delta\kappa_2$ for $|z_1=z_2|\le l_p$ and $\langle \vec{\Delta\kappa'}(z_1)\cdot\vec{\Delta\kappa'}(z_2)\rangle = 0$ for $|z_1-z_2|>l_p$.

For typical transmission fibers that are nominally non-birefringent, the polarization coherence length is on the order of 10-100~m.

After a distance $L$ that is much larger than both correlation lengths $1\_c$, and $1\_p$ the GAWBS field can be approximated as a discrete sum in the following form $$|\delta h(L)\rangle = \Delta z \Sigma_{q=1}^N (\bar{\kappa} + \vec{\Delta\kappa'_q}\cdot\vec{\sigma})|h_0\rangle \sin(\Omega_{nm}t+\zeta_q) \quad (28)$$

where $\Delta z = L/N$. The GAWBS noise power defined as $P_G(L)= \langle\langle \delta h(L)|\delta h(L)\rangle\rangle$ where the outer brackets stand for combined ensemble and time average can be expressed as $$P_G(L) = \Delta z^2 \Sigma_{q=1}^N \Sigma_{p=1}^N [\bar{\kappa}^2 P_0 + \langle \vec{\Delta\kappa'_q}\cdot\vec{\Delta\kappa'_p}\rangle P_0 + \bar{\kappa}\langle($$
$$\vec{\Delta\kappa'_q} + \vec{\Delta\kappa'_p})\cdot\vec{P}_0\rangle + i\langle(\vec{\Delta\kappa'_q}\times\vec{\Delta\kappa'_p})\cdot|\vec{P}_0\rangle]\langle\sin$$
$$(\Omega_{nm}t+\zeta_q)\sin(\Omega_{nm}t+\zeta_p)\rangle\rangle \quad (29)$$

where $P_0 = \langle\langle h_0|h_0\rangle\rangle$, $\vec{P}_0 = \langle h_0|\vec{\sigma}|h_0\rangle$ and it is assumed that the variation in the fiber birefringence and the acoustic mode phases are independent processes.

The third and fourth terms in the summation in Eq.~(29) would vanish as the average of the dot product between GAWBS birefringence vector and the Stokes vector of the optical field would average to zero. The first term is independent of rotation due to fiber birefringence and its accumulation would only depend on the correlation length of the acoustic mode phase variation, but the second term would depend on both the phase variation and also on the polarization rotations.

In the two extreme cases where either $l_c \ll l_p$, $l_p \ll l_c$ Eq.~(29) simplifies to $$P_G(L) = \begin{cases} \frac{P_0 L}{2}(\bar{\kappa}^2 + \Delta\kappa^2)l_c, & l_c \ll l_p \\ \frac{P_0 L}{2}\left(\bar{\kappa}^2 + \Delta\kappa^2\frac{l_p}{l_c}\right)l_c, & l_c \gg l_p \end{cases} \quad (30)$$

Equation~(30) can be simplified into a single line as follows $$P_G(L) = \frac{P_0 L}{2}\left(\bar{\kappa}^2 + \Delta\kappa^2\frac{\min(l_p, l_c)}{l_c}\right)l_c \quad (31)$$

Which is valid only when either $l_p \ll l_c$, or $l_c \ll l_p$. By definition $$\Delta\kappa^2 = \left(\frac{\kappa_{xx} - \kappa_{yy}}{2}\right)^2 + \kappa_{xy}^2, \text{ and } \bar{\kappa}^2 = \left(\frac{\kappa_{xx} + \kappa_{yy}}{2}\right)^2.$$

Note that $\kappa_{\mu\nu}$ is are the time independent portions in Eq.~(22) as the time averaging was performed in Eq.~(29) to obtain Eq.~(30). Equation~(31) shows that there are two contributions to it. One from the $\bar{\kappa}$ term and the other from the GAWBS birefringence term $\Delta\kappa$. As explained above, the $\bar{\kappa}$ term is responsible for phase modulation only. GAWBS noise created by this term will have the same polarization as the input optical field. Therefore GAWBS noise created by this term is called the polarized GAWBS denoted as $P_{GP}$.

GAWBS noise generated by the AK terms in general has both components that are parallel to the input field and orthogonal to it. Therefore the GAWBS noise created by this term is called the unpolarized GAWBS and will be denoted as $P_{GU}$. As such $P_G = P_{GP} + P_{GU}$ where $$P_{GP} = \frac{P_0 L}{2} \bar{\kappa}^2 l_c \qquad (32)$$

$$P_{GU} = \frac{P_0 L}{2} \Delta \kappa^2 \frac{\min(l_p, l_c)}{l_c}$$

$$P_G = P_G + P_{GU}$$

Equation~(32) shows that the GAWBS noise power grows linearly with fiber length L as expected. Here we arrive this conclusion as a consequence of the short correlation length of the acoustic modes responsible for the GAWBS scattering compared to the lengths of interest, i.e. $l_c \ll L$. However, we now have the $l_c$ term entering in the expression that affects the magnitude of the GAWBS noise power. Within $l_c$, to noise power grows quadratically with distance, but the noise power from each section add linearly. Therefore, larger the $l_c$ larger the noise power for the same total length. However, it will be shown later that under the assumptions that GAWBS is generated by ambient temperature and that $l_c$ is equivalent to the average acoustic mode length, the dependence on $l_c$ will be eliminated. What is new is that when $l_p \ll l_c$, effective correlation length for the growth of the GAWBS noise due to the birefringence term reduces to $l_p$ instead of $l_c$. In many cases what matters is the ratio of the GAWBS noise generated to the input optical power. We define the GAWBS scattering ratio (GSR)

$$\Gamma_{GAWBS} = \frac{P_G}{P_0} \qquad (33)$$

Similarly the scattering ratio for the polarized and unpolarized GAWBS noise are defined as $$\Gamma_{GAWBS,P} = \frac{P_{GP}}{P_0}, \Gamma_{GAWBS,U} = \frac{P_{GU}}{P_0} \qquad (34)$$

In Eq.(22), we explicitly retain the time dependence of the coupling coefficients, since these coefficients are created by acoustic modes vibrating at frequencies. These frequencies can be found from Eq.(6). n=0, $$\left[\frac{y^2}{2} J_0(y) - y J_1(y)\right]\left[\frac{y^2}{2} J_0(\alpha y) - \alpha y J_1(\alpha y)\right] = 0 \qquad (35)$$

which gives two separate equations. The solutions of the equation in the first parenthesis belong to the mode group that is pre radial shear waves. Incidentally, the equation in the first parenthesis can be reduced to roots of the second order Bessel function. Shear waves do not contribute to GAWBS. This is because pure shear waves $U_r=0$, and, $U_\varphi(r)$ is a function of r only. Therefore it only produces off-diagonal strain, i.e., $S_{r\varphi}$ with no $\varphi$ dependence. Looking at Eqs.(19-21) all the angular integrals would vanish under these conditions.

The solution to the equation in the second parenthesis belong to the pure radial dilational modes. We can find the acoustic frequencies satisfying this equation by relating them to the $\alpha y_{0m}$ that satisfied this equation as follow:

$$f_{0m} = \frac{y_{0m} V_d}{2\pi a} \qquad (36)$$

where we used $$y = \frac{2\pi f a}{V_s}, \alpha = V_s / V_d.$$

The frequencies of the $TR_{2m}$ modes can also be found in a similar fashion from Eq,(6) by setting n=2. If the fiber core is concentric with the fiber cladding, only two mode groups contributes to the generation of the GAWBS spectrum: n=0 which is responsible for the so called-radial modes $R_{0m}$, and: n=2, which is responsible for the torsional-rotational modes $TR_{2m}$. Therefore we find that the acoustic modes vibrate at discrete frequencies, which in turn, generates strain in the fiber cross-section, and that in turn generates perturbation in the dielectric tensor, which causes coupling as shown in Eqs.(22-23). Since the coupling coefficients vary sinusoidally, they create side tones at the vibration frequencies. To find the magnitude of these side tones, We use Eq.(23), and show the time dependence portion explicitly.

Relating the Results of the Derivation in the Previous Section to how to Reduce the GAWBS of Fiber.

Looking at Eq.(32) we see that the GAWBS scattering ratio (GSR) is related to two sets of quantities. First set is in the $\kappa_{\mu\nu}$ which is related to physical parameters of the fiber such as glass density, and speed of sound etc, and the overlap integral between the propagating optical mode and the acoustic modes. The second set is the coherence length $l_c$, and the polarization diffusion length $l_p$.

Even though it might be difficult to change the physical parameters or some of the design parameters of the fiber to reduce the quantity $\kappa_{p0}$ without adversely affecting other important properties of fiber that are important to keep a high signal quality, it might be possible to reduce the coherence length $l_c$ of the GAWBS scattering and the polarization diffusion length $l_p$.

Reducing the impact of a degradation source through reducing its coherence length is not a new technique used for other sources of impairments, such as polarization-mode dispersion. A technique that was developed to reduce the impact of polarization-mode dispersion was spinning the fiber at a high rate during the drawing process so that the birefringence coherence length was reduced. We have determined that such a technique can also reduce the coherence length of the GAWBS scattering length and through Eq.(32) it would result in reducing the GRS.

In case reducing $l_c$ may not be feasible, we now disclose a second method for reducing GAWBS noise, namely reducing $l_p$.

From equation~(32) it may be observed that $P_{GP}$ does not depend on $l_p$ but $P_{GU}$ does. In particular, if $l_p$ is reduced so much that $l_p \ll l_c$, $P_{GU} \approx 0$, therefore $P_G \approx P_{GP}$. That means that by reducing $l_p$ sufficiently the total GAWBS noise can be reduced.

In our measurements of GAWBS noise in commonly used fibers in long-distance transmission links it was found that the ratio of the polarized GAWBS noise to unpolarized noise is consistent with the case where $l_c \ll l_p$ holds. That means in fact there is room to reduce $l_p$ and reduce GAWBS noise.

Our measurements also showed that unpolarized GAWBS is about 37% of the total GAWBS noise, i.e., total GAWBS noise would reduce by 2.2~dB if all the unpolarized GAWBS noise would be suppressed by sufficiently reducing $l_p$.

To show an example, Table-1 shows the GSR measured for four fibers SMF28, EX2000, Z+130 and EX3000 that are commonly used in long distance optical communications. The Table shows the measured GSR that are for the polarized ($\Gamma_{GAWBS,P}$) and unpolarized ($\Gamma_{GAWBS,U}$) contributions as well as their total $\Gamma_{GAWBS}$.

TABLE 1

GAWBS measurement results for commonly used long distance optical transmission fibers.

| Fiber | Length (km) | Effective area (μm2) | $\Gamma_{GAWBS}$ (dB) | $\Gamma_{GAWBS,P}$ (dB) | $\Gamma_{GAWBS,U}$ (dB) |
|---|---|---|---|---|---|
| SMF28 | 80.3 | 80.8 | −34.9 | −41.3 | −44 |
| Ex2000 | 40.2 | 112.9 | −43.8 | −45.9 | −48.2 |
| Z + 130 | 60.2 | 138 | −42.9 | −45 | −47.5 |
| EX3000 | 60.4 | 154.9 | −43.3 | −45.5 | −47.8 |

Just to reiterate, per Eq.~(32), reducing $l_p$ sufficiently, suppresses the unpolarized contribution. Therefore total GSR reduces from $\Gamma_{GAWBS}$ in Table-1 to the level of $\Gamma_{GAWBS,P}$ which is about 2.2 dB.

We now disclose two methods for reducing $l_p$. The first method is to increase fiber birefringence. Those skilled in the art will appreciate that this amounts to increasing $\vec{b}$ in Eq.~(26). Note that $\vec{b}$ is a random vector. We increase its average magnitude, which still increase how fast the polarization diffuses.

It should be noted that increasing fiber birefringence is known to increase another source fiber impairment called polarization mode dispersion (PMD). However, modern communication systems can remove large amounts of PMD, therefore fiber birefringence can be increased significantly without causing any adverse effect on the signal quality. In fact PMD marginally helps reduces (large improvement in dispersion compensated links and minimal improvement in uncompensated links) yet another fiber impairment source, the fiber nonlinearity. Therefore, if PMD is not too large that the receiver signal processing unit can remove it effectively, this would be a viable solution to reduce $l_p$.

There are well known methods for increasing local birefringence, for instance introducing small asymmetry in the fiber core, or introducing small asymmetric stress around the fiber core where the light is guided.

The second method we propose is to reduce the so called coherence length of birefringence. This amounts to how fast the orientation of the random birefringence vector $\vec{b}$ changes in Eq.~(26). The faster the birefringence vector orientation changes, the faster the optical birefringence loses its memory along the fiber length. A benefit of this method is that it actually reduces the PMD. Therefore with this method PMD is not a concern. As an example, a well known technique to reduce birefringence correlation length is to spin the fiber preform as it is drawn.

Figure 4:
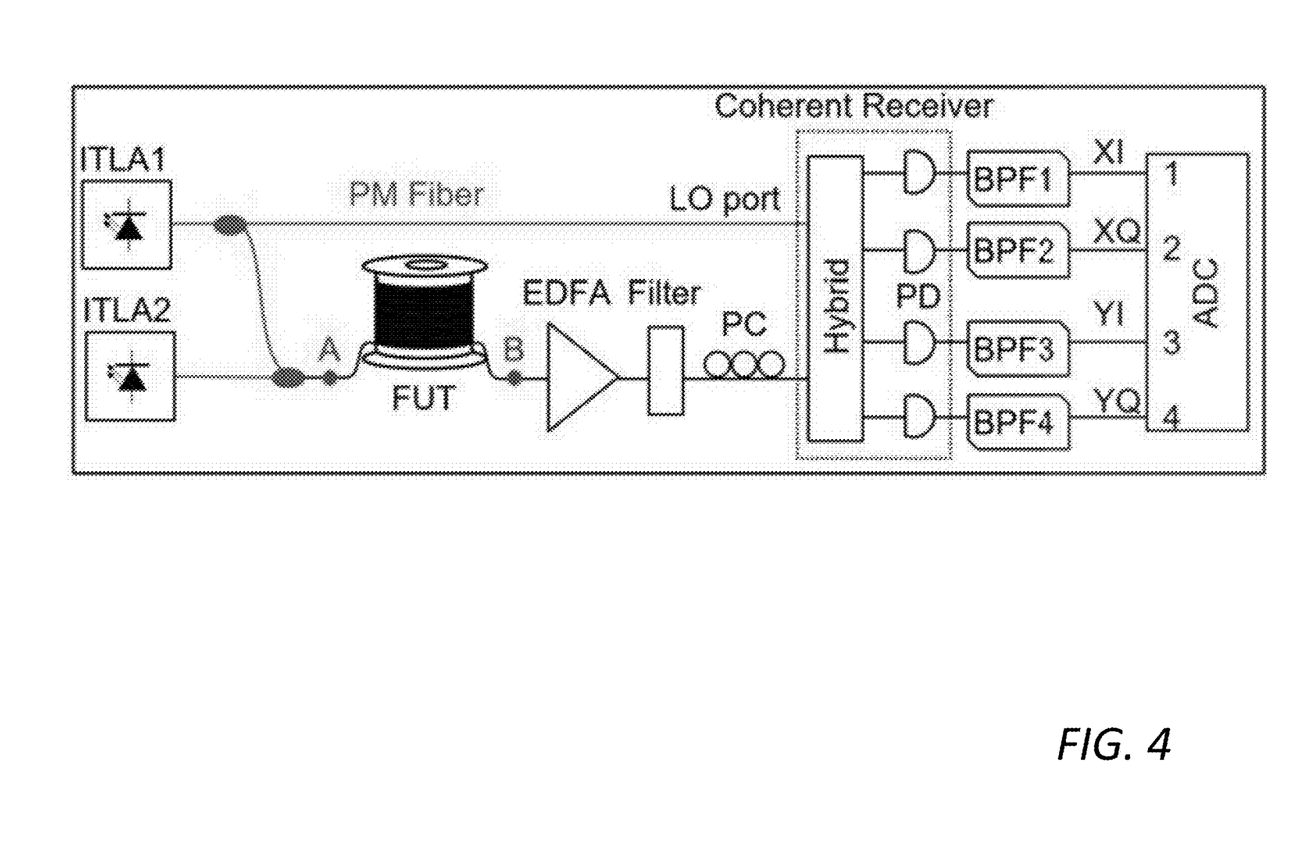
FIG. 4 is a schematic diagram of an illustrative homoodyne arrangement for evaluating methods according to aspects of the present disclosure.

FIG. 4 is a schematic diagram of an illustrative homoodyne arrangement for evaluating methods according to aspects of the present disclosure. With reference to that figure, it may be observed that in our inventive arrangement according to the present disclosure, light emitted from a continuous-wave (CW) laser is split into two parts. One part serves as local oscillator, and the other part is combined with light emitted from second laser (calibrating laser) Laser-cal for reasons that will be clear later, and the combined light is launched into the FUT.

After traversing the FUT, the light may be amplified through the effect of amplifiers which increase signal power subsequently filtered by—for example—optical band-pass filters which limit ASE noise. Even though a PC is included in the signal path in FIG. 4, it is not necessary.

The filtered signal is then directed to a signal port of a coherent receiver as shown in the figure in a dashed box. As is known, a coherent receiver is a ubiquitous device in the optical communications field. Operationally, a hybrid within the coherent receiver receives as input the LO and the optical signal. It creates 4 separate paths each of which overlaps the signal and the LO in two orthogonal polarizations—denoted as X and Y. Each polarizations overlaps in two quadratures known in the art as in-phase and 90-degrees out of phase which are typically denoted as I and Q. The beating in the 4 quadratures are detected by 4 balanced photodiodes. The beating signals are passed through RF band-pass filters and—after filtering—the 4 beating signals are sampled by an ADC. Note that all the phase, amplitude and polarization information regarding the signal with respect to the LO is contained in these 4 beating signals.

We can now further explain certain particular advantages of our inventive arrangement and application. First, since we use a coherent receiver, we retain all the information in all the polarizations at all times. As a result, we can measure GAWBS noise in both polarizations simultaneously and need not need manage polarization state of the laser. Additionally, any drift of signal polarization can be traced and removed using signal processing.

The bandpass filters (BPFs) positioned after the coherent receivers improve the sensitivity of our measurement set up. They allow for shifting the dynamic range of the measurement to the range having the GAWBS noise, and it also removes noise from ASE-ASE beating. We note that GAWBS noise extends to about 1 GHz away from the CW laser, which we may refer to as the carrier.

The optical BPF's shown positioned after the erbium-doped fiber amplifiers (EDFAs) filters out the ASE noise, however, in practice it is difficult to find ASE filters with band-pass bandwidths as narrow as 2 GHz. Typically, such filters tend to be as wide as 50 GHz. An alternative is to digitally filter the out of band noise if the ADC has large enough bandwidth however, sampling noise at such an unnecessarily high bandwidth introduces an unnecessary noise floor. Our solution to this problem is to use an RF filter that cuts out signal above 1 GHz after the photodiodes, but before sampling. In this manner the out-of-band ASE is prevented to fold back into the 1 GHz after sampling, and also excess noise from ASE-ASE beating noise from the higher frequency noise is eliminated. As will be appreciated, one advantage of using BPFs is that it allows for using practical and low cost optical BPFs, while also allowing for using a low sampling rate ADC, at the same time prevent deterioration from out-of-band ASE noise. Note that for some special fibers the GAWBS noise can extend further or less than 1 GHz. The BPFs higher rejection edge can be reduced or increased as required according to the FUT.

TABLE 1

GAWBS measurement results for commonly used long distance optical transmission fibers.

| Fiber | Length (km) | Effective area (μm2) | $\Gamma_{GAWBS}$ (dB) | $\Gamma_{GAWBS,P}$ (dB) | $\Gamma_{GAWBS,U}$ (dB) |
|---|---|---|---|---|---|
| SMF28 | 80.3 | 80.8 | −34.9 | −41.3 | −44 |
| Ex2000 | 40.2 | 112.9 | −43.8 | −45.9 | −48.2 |
| Z + 130 | 60.2 | 138 | −42.9 | −45 | −47.5 |
| EX3000 | 60.4 | 154.9 | −43.3 | −45.5 | −47.8 |

At this point, while we have presented this disclosure using some specific examples, those skilled in the art will recognize that our teachings are not so limited. Accordingly, this disclosure should be only limited by the scope of the claims attached hereto.

The invention claimed is:

1. A method for reducing guided acoustic wave Brillouin scattering (GAWBS) processes taking place in an optical fiber that is a component part of an optical communications system by reducing the polarization diffusion length of the optical fiber,
   wherein the polarization diffusion length of the optical fiber is reduced by increasing the birefringence of the optical fiber the and
   wherein the birefringence of the optical fiber is increased with respect to its average magnitude.

2. A method for reducing guided acoustic wave Brillouin scattering (GAWBS) processes taking place in an optical fiber that is a component part of an optical communications system by reducing the polarization diffusion length of the optical fiber,
   wherein the polarization diffusion length is reduced by reducing the coherence length of birefringence of the optical fiber; and
   wherein the coherence length of birefringence of the optical fiber is reduced by spinning a fiber preform of the optical fiber as it is drawn during manufacture; and
   wherein the optical fiber exhibits an asymmetry in its optical core such that the birefringence average magnitude of the optical fiber is achieved.

* * * * *